United States Patent [19]

Veaux et al.

[11] Patent Number: 4,948,069
[45] Date of Patent: Aug. 14, 1990

[54] DEVICE FOR STEERING THE NOSE WHEEL TRAIN OF AN AIRCRAFT LANDING GEAR

[75] Inventors: Jacques Veaux, Chatillon; Michel Derrien, Versailles; Jean-Pierre Hainaut, La Queue En Brie, all of France

[73] Assignee: Messier-Hispano-Bugatti, Montrouge, France

[21] Appl. No.: 392,583

[22] Filed: Aug. 11, 1989

[30] Foreign Application Priority Data

Aug. 22, 1988 [FR] France ................. 88 11100

[51] Int. Cl.$^5$ .............................................. B64C 25/50
[52] U.S. Cl. ................................. 244/50; 244/102 R
[58] Field of Search ............... 244/50, 102 R, 102 SL; 280/93, 95.1, 846, 270

[56] References Cited

U.S. PATENT DOCUMENTS 2,650,782  9/1953  Fehring ............................. 244/50
2,838,944  6/1958  Kendall ............................ 244/50
2,930,547  3/1960  Hogan .

FOREIGN PATENT DOCUMENTS 1159446  6/1958  France .
901836   7/1962  United Kingdom .

Primary Examiner—Galen L. Barefoot
Attorney, Agent, or Firm—Sixbey, Friedman, Leedom & Ferguson

[57] ABSTRACT

A device for steering the wheels fitted to the bottom end of the leg (1) of the nose landing gear of an aircraft, the wheels being steered about the axis of the leg, the leg (1) comprising a strut (2) hinged to the structure of the aircraft, a tube (4) mounted to rotate inside the strut (2) and projecting outside the strut, a rod (5) slidably mounted inside the tube (4) and carrying the wheels at its free end, and a scissor linkage (6) for constraining the tube (4) and the rod (5) to rotate together. At least one actuator (8a, 8b) is situated in a plane substantially perpendicular to the axis of the leg (1), the end of the actuator rod (16a, 16b) being hinged to a side lug (17a, 17b) for rotating the tube (1), and the actuator cylinder being hinged to two parallel plates (7, 10) extending perpendicularly to the axis of the leg (1), with one (7) of the plates being fixed to the strut (2) and with the other plate (10) being rotatably mounted about the tube (4) and being prevented from rotating relative to the strut (2) by means of a dog (14) fixed to the strut.

5 Claims, 1 Drawing Sheet

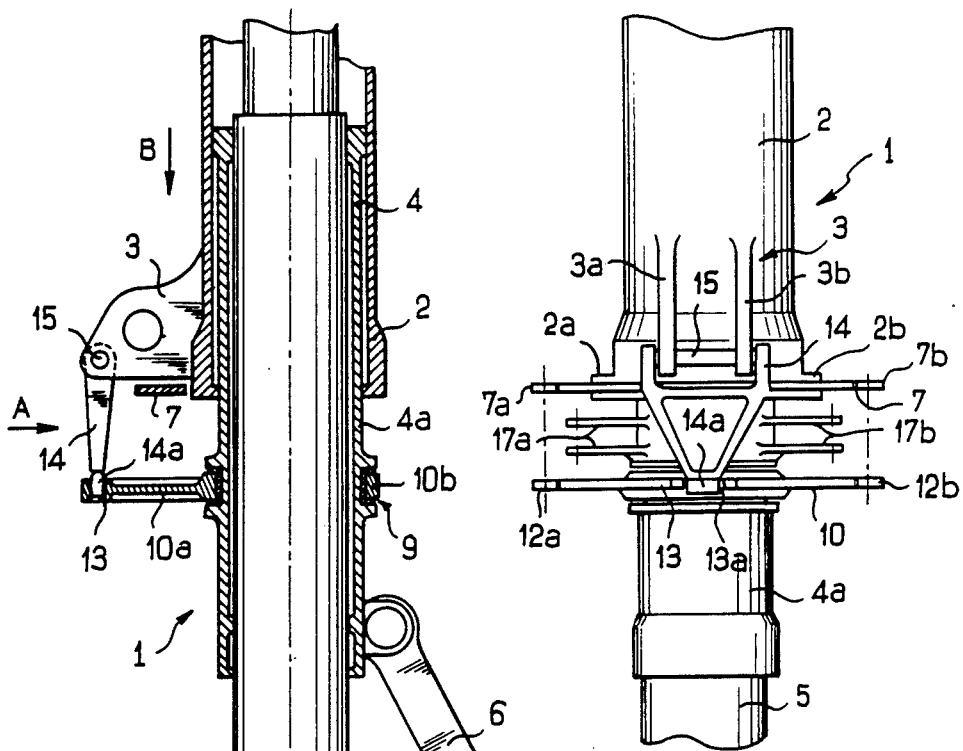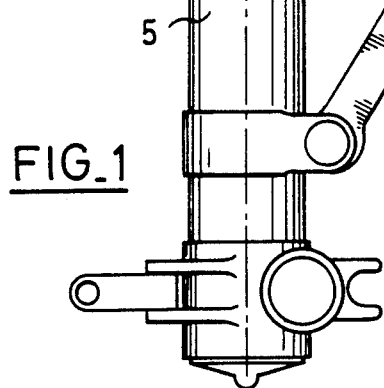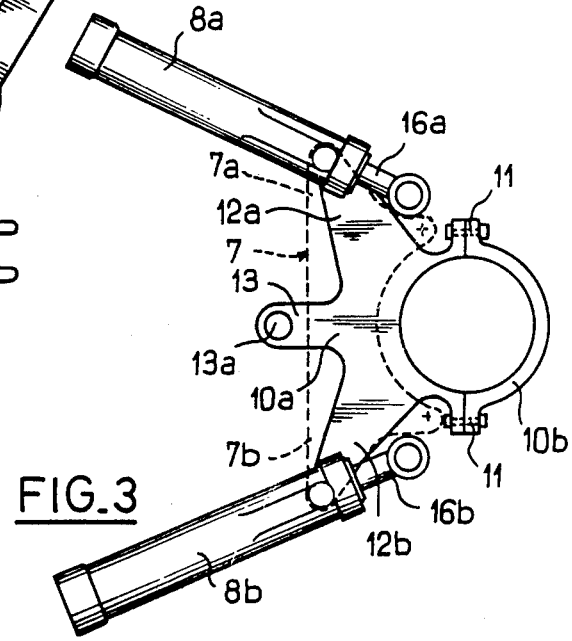
FIG_1  FIG_2  FIG_3

DEVICE FOR STEERING THE NOSE WHEEL TRAIN OF AN AIRCRAFT LANDING GEAR

The present invention relates to a device for steering the wheel train carried by the nose landing gear of an aircraft, i.e. for swivelling the wheel train about the axis of the landing gear.

BACKGROUND OF THE INVENTION

When running on the ground, an aircraft is generally steered by the wheel train mounted on the front or nose landing gear. This wheel train is fitted to the end of the telescopic leg of the landing gear and steering requires the end rod of the telescopic leg to be rotated, which end rod also slides axially relative to a strut which contains other apparatuses, including a shock absorber.

At present, there are two main types of solution for steering the nose wheel train, and which depend in part on the architecture of the landing gear. Landing gear normally includes a tubular strut which is the structural part hinged to the aircraft and which is tilting in order to retract and in order to lower the landing gear, and which has all of the driving members, braces, and locking members of the landing gear coupled thereto. The telescopic rod carrying the axle projects from this strut and co-operates with a shock absorber housed inside the strut.

In a first type of steering, the strut serves only to withstand forces, and in this case it is generally made of an aluminum alloy. In order to steer the wheels, this type of landing gear uses a tube between the strut and the rod, said tube being mounted to rotate inside the strut and being prevented from moving axially relative thereto in a position in which it projects from the strut. The rod then slides inside the tube while also being constrained to rotate therewith by means of an external scissor linkage mounted between the projecting portion of the tube and the portion of the rod which is close to the wheels. The portion of the rotary tube inside the strut is fixed to a toothed wheel which co-operates with a rack extending orthogonally to the axis of the tube and whose longitudinal displacements (as obtained, for example, by hydraulic means such as an actuator), cause the tube to rotate about its own axis inside the strut. This rotation is transmitted to the rod by the scissor linkage.

In a second type of steering, the strut may also contribute to guidance and shock absorbing for the rod. In this case, the strut is generally made of steel and the rod slides in it directly. In order to rotate the rod about its own axis, the mechanism used consists in a scissor linkage coupled between the portion of the rod which is close to the wheels and a ring which is mounted to rotate in an external groove on the strut. The ring includes external tabs each coupled to the rod of an actuator whose cylinder is hinged to a lateral extension on the strut. Thus the actuators rotate the ring and rotation of the ring is transmitted to the rod of the landed gear by the scissor linkage.

The present invention seeks to combine the respective advantages of these two prior steering mechanisms in an embodiment which is simple and cheap, i.e. using a strut made of aluminum alloy and independent actuators which are easily dismounted.

SUMMARY OF THE INVENTION

To this end, the present invention provides a device for steering the wheels fitted to the bottom end of the leg of the nose landing gear of an aircraft, said wheels being steered about the axis of said leg, said leg comprising a strut hinged to the structure of the aircraft, a tube mounted to rotate inside the strut and projecting outside the strut, a rod slidably mounted inside the tube and carrying the wheels at its free end, and a scissor linkage for constraining the tube and the rod to rotate together. According to the invention, the device further comprises at least one actuator situated in a plane substantially perpendicular to the axis of the leg, the end of the actuator rod being hinged to a side lug for rotating the tube, and the actuator cylinder being hinged to two parallel plates extending perpendicularly to the axis of the leg, with one of the plates being fixed to the strut and with the other plate being rotatably mounted about the tube and being prevented from rotating relative to the strut by means of a dog fixed to the strut. This architecture makes it possible to use wheel actuators outside the strut, thereby providing very easy access to them, while nevertheless retaining the advantages of lightness and cheap manufacture associated with a strut made of aluminum alloy.

BRIEF DESCRIPTION OF THE DRAWING

An embodiment of the invention is described by way of example with reference to the accompanying drawing, in which:

FIG. 1 is a partially cut-away diagrammatic side view of landing gear including a device of the invention (with the actuators being omitted from the figure);

FIG. 2 is a fragmentary view along arrow A of FIG. 1; and

FIG. 3 is a fragmentary plan view seen looking along arrow B of FIG. 1, showing the actuator fitted to the device of the invention but omitting parts of the landing gear leg in order to avoid overcrowding the drawing.

DETAILED DESCRIPTION

The figures show the end of a nose landing gear, and the bottom portion thereof would normally have wheels mounted thereon which are not shown.

The landing gear includes a leg 1 essentially comprising a top strut 2 of which only the bottom portion is visible. The top portion of the strut 2 is hinged to the structure of the aircraft (not visible in the drawing). The landing gear also includes a brace constituted by a toggle-action type of member hinged between the aircraft and the bottom portion of the strut 2 at a fork 3 provided for this purpose.

Inside the strut 2, a tube 4 is mounted to rotate at its top end, and it is prevented from moving axially by means not shown so as to occupy a position such that a bottom portion 4a of the tube projects beneath the strut 2. The tube 4 constitutes a guiding bearing surface enabling a rod 5 to slide axially relative to the strut 2. The bottom end of the rod 5 outside the tube 4 carries the wheels of the nose landing gear. An external scissor linkage 6 provides a rotary connection between the tube and the rod while nevertheless allowing them to move axially relative to each other. The linkage extends between the bottom end of the tube and the bottom portion of the rod.

These prior art dispositions are fitted with means specific to the invention as follows.

The bottom portion of the strut 2 is provided with tabs 2a and 2b for fixing to a fixed plate 7. The plate extends perpendicularly to the axis of the landing gear leg, and has two tabs 7a and 7b each forming the top branch of a fork for a hinge connection to an actuator 8a or 8b. In a variant (not shown) it would be possible to use only one actuator, but for reasons of actuator dimensions, it is preferred to use two convergent actuators which are coplanar in a plane extending substantially perpendicularly to the axis of the landing gear leg, with the actuators disposed symmetrically on either side of a plane containing said axis when they are in their position corresponding to the wheels being steered to lie on the longitudinal axis of the aircraft.

The portion 4a of the tube 4 includes a groove 9 which receives a second plate 10 which is rotatably mounted and which likewise extends perpendicularly to the axis of the landing gear. The second plate 10 is built up from two portions 10a and 10b which are assembled by bolts 11 in order to enable it to be put into place in the groove 9. The portion 10a has three lugs 12a, 12b, and 13. The lugs 12a and 12b extend beneath the lugs 7a and 7b of the first plate 7 and each of them forms the other branch of a hinge connection for the corresponding actuator 8a or 8b. The lug 13 has an opening 13a for receiving the bottom end 14a of a dog 14 for causing the second plate 10 to rotate with the strut 2. Opposite the lugs, the portion 10a is shaped as a semicircular clamp which cooperates with the other semicircular clamp portion 10b to surround the tube 4 inside the groove 9.

The dog 14 constitutes an abutment which is fixed to the strut 2 via the tabs 3a and 3b of the fork 3 for coupling to the brace of the landing gear leg. To this end, the dog 14 is hinged about an axis 15 to the fork 3 with the tabs of the fork extending both outwards and downwards. This fixing could be provided by any other suitable means. It can be seen that in this case the dog is constituted by a flat lever disposed edgeon to the couples it is intended to withstand.

The actuators 8a and 8b are hinged at their cylinder ends, with the actuator 8a being hinged between the lugs 7a and 12a of plates 7 and 10, and the actuator 8b being hinged between lugs 7b and 12b of the same plate. The rods 16a and 16b of the actuators are hinged to respective pairs of parallel side tabs 17a and 18a carried by the tube between the end of the strut and the groove 9. The positions of the actuators relative to the tube 4 are determined so as to enable the tube to rotate through an angle which is compatible with the tightness of the turning circle required for the aircraft. FIG. 3 shows the geometry of the means of the invention when the wheels lie in the longitudinal axis of the aircraft.

In order to steer the wheels, the actuators 8a and 8b are powered in the desired direction, e.g. the rod 16a is extended while the rod 16b is retracted, thereby swivelling the wheels clockwise as seen from above. The cylinders of the actuators pivot between the plates 7 and 10 about their fixed hinge points since the plates 7 and 10 are fixed to the strut, with the plate 7 being fixed directly thereto and with the plate 10 being fixed by the dog 14. Since the plate 10 is held axially by the groove 9 which is itself held stationary axially relative to the strut because the tube 4 does not move axially within the strut, and since it is prevented from rotating by the dog 4, the plate 10 constitutes a stationary support for the hinges of the cylinders of actuators 8a and 8b. The forces to which the cylinders are subjected when they are powered, are thus taken up in balanced manner by the fixed structure connected to the strut. As for the ends of the rods 16a and 16b, they describe circular arcs about the axis of the landing gear, rotating the tube 4 as they rotate, by virtue of the tabs 17a and 17b of said tube to which the rods are hinged. This rotation is transmitted to the rod 5 via the scissor linkage 6, and the wheels are thereby steered.

It can be seen that this disposition of the actuators is simple and that they are easy of access for installation, dismantling, and maintenance. An advantageous application of the invention lies in equipping large transport aircraft.

We claim:

1. A device for steering the wheels fitted to the bottom end of the leg of the nose landing gear of an aircraft, said wheels being steered about the axis of said leg, said leg comprising a strut, a tube mounted to rotate inside the strut and projecting outside the strut, a rod slidably mounted inside the tube and carrying the wheels at its free end, and a scissor linkage for constraining the tube and the rod to rotate together, wherein the device comprises at least one actuator situated in a plane substantially perpendicular to the axis of the leg, the end of the actuator rod being hinged to a side lug for rotating the tube, and the actuator cylinder being hinged to two parallel plates extending perpendicularly to the axis of the leg, with one of the plates being fixed to the strut and with the other plate being rotatably mounted about the tube and being prevented from rotating relative to the strut by means of a dog fixed to the strut.

2. A device according to claim 1, including two coplanar actuators disposed symmetrically to each other about a plane containing the axis of the leg.

3. A device according to claim 1, wherein the second above-mentioned plate is constituted by two portions which are coupled together to form a collar rotatably received in a groove in the rotary tube.

4. A device according to claim 1, wherein the above-mentioned dog is fixed to the strut by means of a hinge fork.

5. A device according to claim 4, wherein the branches of the fork are formed by extensions of the tabs of the hinge fork for the brace of the landing gear leg.

* * * * *